United States Patent [19]
Joseph et al.

[11] Patent Number: 5,787,547
[45] Date of Patent: Aug. 4, 1998

[54] CASTOR FOR TROLLEY ADAPTED TO BE IMMOBILIZED ON A TRAVELLING WALKWAY

[75] Inventors: Alice Joseph, Schiltigheim; Michel Schlienger, Illkirch-Graffenstaden, both of France

[73] Assignee: Ateliers Reunis Caddie S.A., Schiltigheim, France

[21] Appl. No.: 267,079

[22] Filed: Jun. 28, 1994

[30] Foreign Application Priority Data

Jul. 5, 1993 [FR] France .................. 93 08 193

[51] Int. Cl.$^6$ .................................................. B60B 33/00
[52] U.S. Cl. ............................ 16/35 R; 188/1.12; 188/74
[58] Field of Search ...................... 16/35 R; 188/1.12, 188/74, 78, 184, 185, 5

[56] References Cited

U.S. PATENT DOCUMENTS

| 3,305,064 | 2/1967 | Mullis et al. ................ 16/35 R |
| 3,608,693 | 9/1971 | Stosberg ....................... 16/35 R |
| 3,751,757 | 8/1973 | Stosberg et al. ............. 16/35 R |
| 5,083,341 | 1/1992 | Milbredt et al. ............. 16/35 R |

FOREIGN PATENT DOCUMENTS

| 0 373 398 | 6/1990 | European Pat. Off. ........ B60B 33/02 |
| 2 373 405 | 4/1983 | France ................... B60B 33/00 |
| 3128720 | 5/1983 | Germany ................ 16/35 R |
| 2 119 042 | 11/1983 | United Kingdom ........... B62B 5/04 |
| 2 147 377 | 5/1985 | United Kingdom ........... B62B 5/04 |

Primary Examiner—Chuck Y. Mah
Attorney, Agent, or Firm—Pennie & Edmonds

[57] ABSTRACT

A trolley castor having two flanges which freely rotate about a spindle carried by arms of a yoke is described. The flanges are separated by a distance corresponding to the usually standardized distance between the grooves of a walkway surface. Between the flanges is a brake disk which can rotate around the spindle. Fixed to an edge of the brake disk is a brake skid having a sole. An end piece, which extends into a cup formed by the yoke, is fixed to another portion of the brake disk. When the castor moves onto a grooved surface, the periphery of the flanges are engaged in the groove and the brake skid comes into contact with the ribs of the grooved walkway. This causes the brake disk to rotate slightly around the spindle until the end piece abuts the inside wall of the cup, thus immobilizing the trolley.

13 Claims, 2 Drawing Sheets

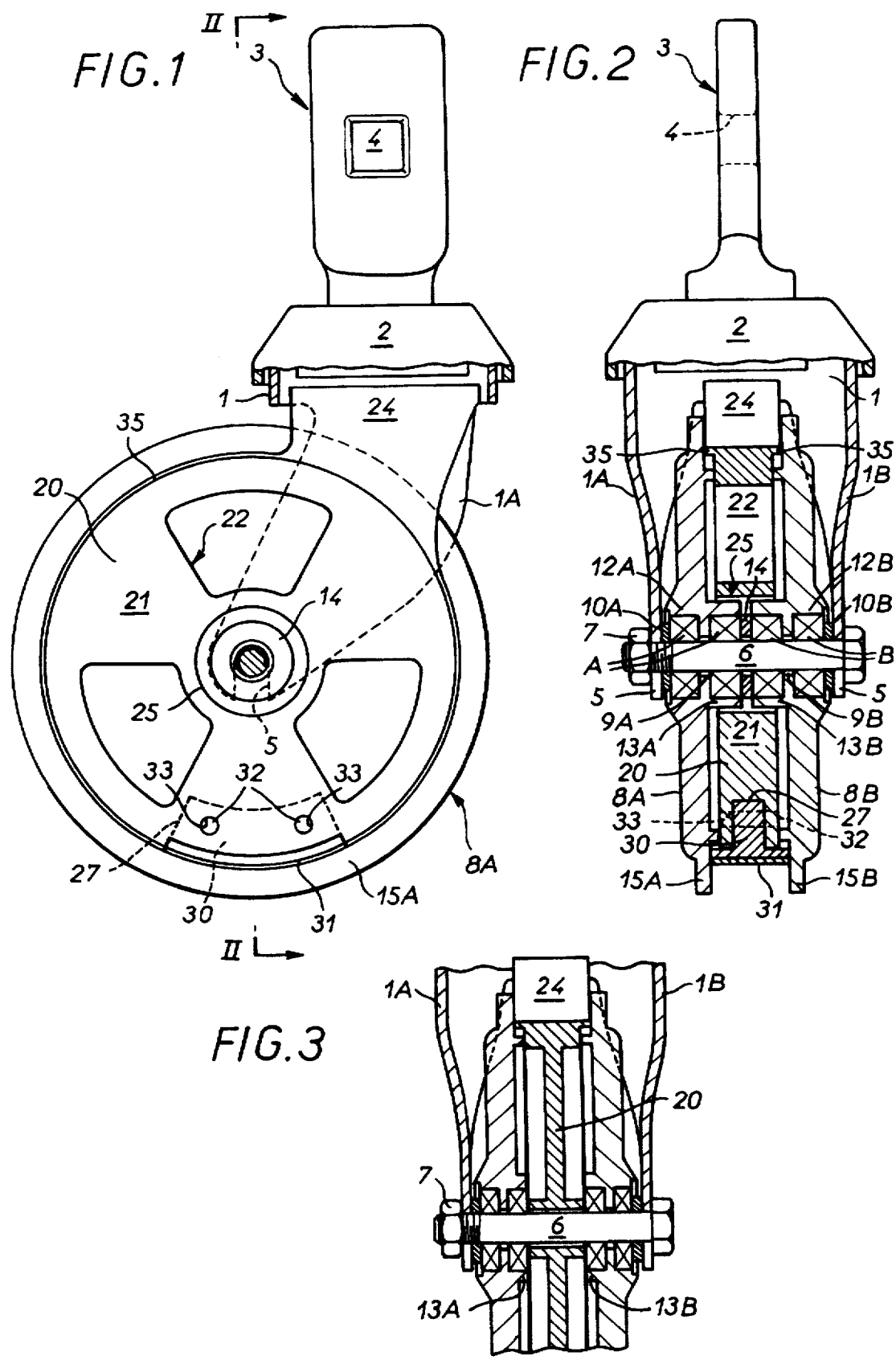

CASTOR FOR TROLLEY ADAPTED TO BE IMMOBILIZED ON A TRAVELLING WALKWAY

BACKGROUND OF THE INVENTION

1. Field of the invention

The present invention concerns a castor for a trolley adapted to be immobilized on a travelling walkway and especially on a walkway with a grooved surface.

2. Description of the prior art

The castor is of the type having two flanges free to rotate about a spindle carried by the arms of a fixed or pivoting yoke, the distance between the flanges at their periphery corresponding to the usually standardized distance between the grooves of the walkway surface so that when the castor moves onto the surface both flanges are engaged in the grooves. A braking device is then in contact with the ribs of the surface and immobilizes the trolley on the surface.

One proposed brake device is a brake skid fixed to the yoke and projecting cantilever fashion externally of the castor. Another proposed solution is to provide a brake skid recessed between the two flanges, mounted on the same spindle, the latter being square in cross-section to prevent rotation of the skid.

This latter design is advantageous as compared with the first as it avoids problems of deterioration of the exterior brake devices. It has its own drawbacks, however: the spindle on which the flanges rotate must take all of the braking loads and manufacturing this spindle with a square cross-section portion is costly.

An object of the present invention is to alleviate these drawbacks.

SUMMARY OF THE INVENTION

The present invention consists in a castor for a trolley adapted to be immobilized on an inclined walkway having a grooved surface defined by ribs and grooves and having a given groove spacing, said castor comprising:

a yoke having two side arms supporting a rotation spindle;

two flanges freely rotatable about said rotation spindle, the distance between said flanges corresponding to the groove spacing; and brake means recessed between said two flanges and adapted to come into contact with ribs of a grooved surface when said two flanges are engaged in grooves of the grooved surface, said brake means being freely rotatable about said spindle and having an end piece adapted to abut against a part of the trolley to block rotation of the brake means.

The design eliminates all torsion on the castor spindle when the brakes are applied. The brake means of the invention, coming into contact with the ribs of the grooved surface, is caused to rotate because it is freely rotatable about the spindle, but its range of angular movement is arrested as soon as its end piece abuts against a part of the trolley. In this way braking forces are transmitted directly to the trolley.

The part on which the end piece abuts is any part of the trolley that is not rotating about the rotation spindle of the castor.

In a preferred embodiment of the invention the end piece of said brake means abuts against the inside of the castor yoke.

In other specific embodiments the brake means is a disk having a radial projection forming the end piece.

Manufacture of the castor of the invention is simplified, as is its fitting, the two flanges and the brake means being freely rotatable about the same spindle, which can be a standard bolt, the spindle being itself mounted in the arms of the yoke with no special arrangements.

Also, the arms of the yoke can be lightened, given that they are no longer stressed by transmission of braking forces.

The present invention is explained in more detail and other advantages of the present invention emerge from the following description given with reference to the appended drawings.

BRIEF DESCRIPTION OF THE DRAWINGS

FIG. 1 is a side view of a castor partly cut away, one flange being omitted to give a clearer view of the intermediate member for immobilizing the trolley.

FIG. 2 is a view in section on the line II—II in FIG. 1.

FIG. 3 is a view in section similar to that of FIG. 2 and illustrating another embodiment of the invention.

DETAILED DESCRIPTION OF THE PREFERRED EMBODIMENTS

Figure 4:
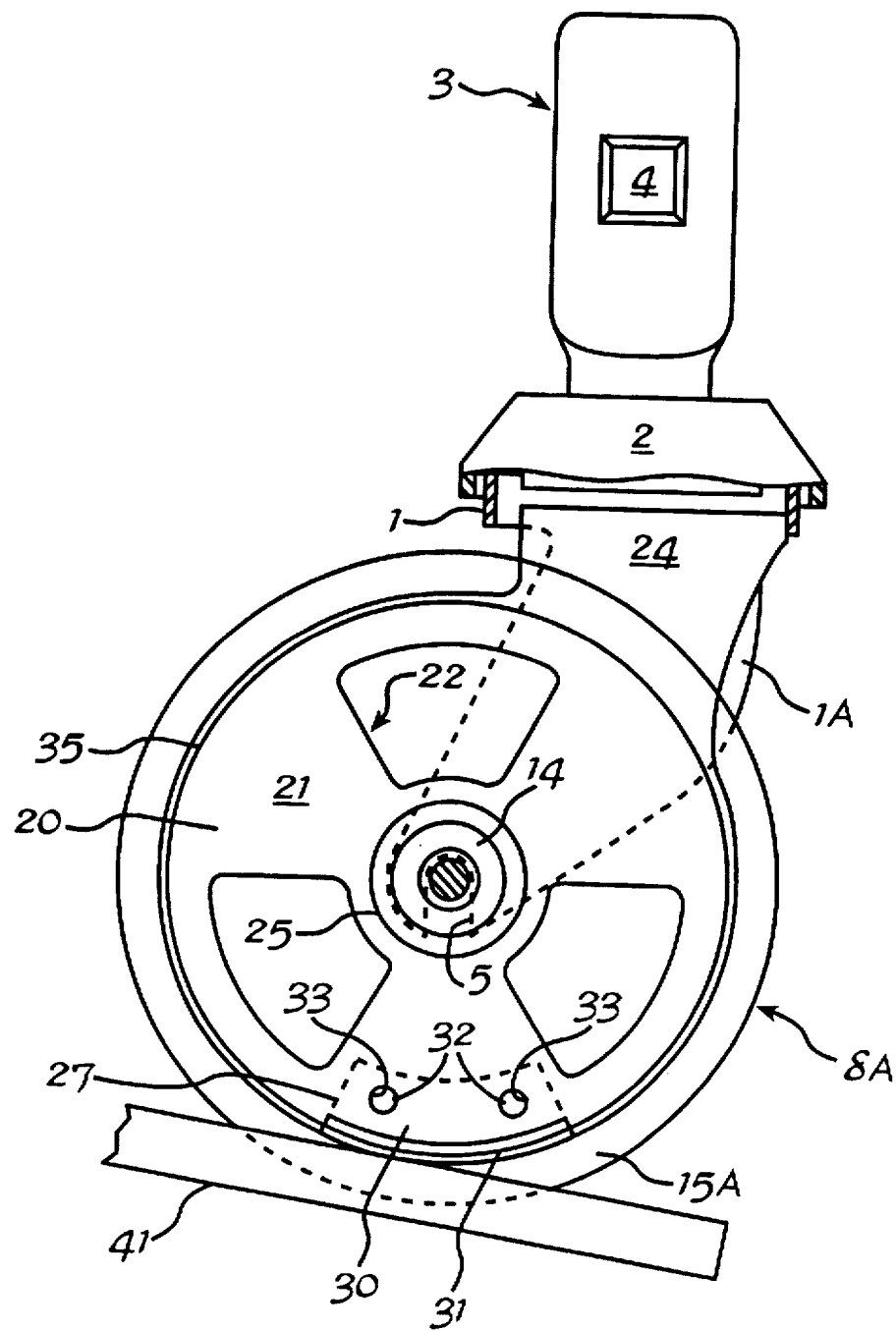
FIG.4 is a side view of a castor, partially cut away, on an incline showing the end piece abutting the side of the cup.

In the embodiment of the invention shown in FIGS. 1 and 2 the castor comprises a yoke forming a downwardly open cup 1 with two side arms 1A and 1B. The yoke is mounted under a pivoting cup 2 supporting a lug 3 with a slot 4 for fixing it to the trolley.

Each of the arms 1A and 1B has a cut-out 5 adapted to receive the shank of a screw 6 the smooth part of which constitutes the rotation spindle of two identical flanges 8A and 8B. Each of these flanges is freely rotatable on a pair of ball bearings A and B. Each flange has a respective axial passage 9A, 9B for the screw 6. On their outside surfaces the flanges have a respective circular indent 12A, 12B for a first ball bearing and on their inside surface a respective circular housing 13A, 13B for a second ball bearing. As shown in FIG. 2, the assembled two flanges face each other with a washer 14 disposed between them to separate the two inner bearings. A nut 7 cooperating with the threaded end part of the screw 6 fastens the flanges 8A, 8B to the arms 1A and 1B of the yoke. Two washers 10A and 10B immobilize and protect the ball bearings.

The flanges are sized so that their respective peripheral areas 15A, 15B can engage in the grooves of the walkway surface.

The flanges are conventionally made by molding onto a disk of non-skid materials such as polyurethane a material to strengthen the disk whilst leaving exposed the peripheral area of the disk, adapted to engage in the grooves.

To immobilize the castor, when its flanges 8A and 8B are engaged in the grooves of the walkway surface, the invention provides an intermediate brake member 20 which is here a molded block of material. It comprises a disk 21 with voids 22 to reduce its weight and an axial passage 25 through it for receiving the housings 13A and 13B of the flanges, with a radial projection forming an end piece 24 accommodated with play in the cup 1 of the yoke.

Thus angular movement of the intermediate brake member 20 about the castor axis is limited by the inside walls of the cup 1.

The part of the disk 21 which comes into contact with the ribs of the walkway surface includes a recess 27 to accommodate a removable skid 30 with a non-skid material sole 31 molded onto it. The skid 30 is attached by pins 32 inserted in holes 33. The figures show that when the skid 30 is nested in its housing its sole 31 is aligned circumferentially with the periphery of the disk 21.

To prevent foreign bodies getting between the flanges 8A, 8B and the intermediate brake member 20 these members are nested together. The surfaces of the disk 21 have a peripheral projection 35 adapted to nest in a complementary profile on the inside surface of the respective flanges 8A and 8B. This also enables self-centering of the flanges and facilitates mounting them.

The various components of the castor are assembled together in very simple manner. The flanges 8A and 8B fitted with their ball bearings and the central protecting washer 14 are nested with opposite sides of the intermediate member. The screw 6 is inserted into the respective axial holes 9A, 9B in the flanges 8A, 8B. The end piece 24 of the intermediate brake member 20 is then positioned in the cup 1 of the yoke. The shank of the screw 6 is inserted into the slot 5 in each flange 1A and 1B and the nut 7 is tightened down.

In service, when the castor moves onto the grooved surface of the travelling walkway, the peripheral areas 15A, 15B of the flanges engage in the grooves. When the skid 30 of the intermediate brake member 20 contacts the ribs 41, of the walkway surface, the disk begins to rotate and the end piece 24 of the intermediate member abuts against the inside walls of the yoke cup and so immobilizes the castor.

FIG. 3 shows an alternative embodiment in which the intermediate brake member 20 is freely rotatable on the smooth part of the screw 6 and not on the outside of the housings 13A, 13B of the flanges, as previously.

A machined spindle with bearing surfaces of different diameter can also be used for the ball bearings, on the one hand, and for the intermediate member, on the other hand.

Other embodiments are feasible, for example the brake skid can comprise a simple strip of non-skid facing in the area in contact with the ground, made by molding on polyurethane, for example.

Also, the circumferential alignment of the active surface of the brake skid with the remainder of the intermediate member is not mandatory. It is simply recommended for avoiding soiling.

Furthermore, the fixing of the castor to the trolley by means of a lug with a hole can be replaced by any other appropriate fixing means.

There is claimed:

1. Castor for a trolley adapted to be immobilized on an inclined walkway having a grooved surface defined by ribs and grooves and having a predetermined groove spacing, said castor comprising:

a yoke defining a downwardly open cup and having two side arms supporting a rotation spindle;

two spaced-apart flanges rotatable mounted on said rotation spindle between said side arms, the spacing between respective peripheral areas of said flanges corresponding to said groove spacing; and brake means recessed between said two flanges and adapted to come into contact with said ribs of said grooved surface, said brake means being freely rotatable about said spindle and having an end piece housed in said cup of said yoke, said end piece being adapted to abut against said cup to block rotation of the brake means.

2. Castor according to claim 1 wherein said brakes means comprises a disk having a radial projection, said radial projection forming said end piece.

3. Castor according to claim 1 wherein said brake means comprises a housing adapted to receive a removable skid having a sole made of non-skid material.

4. Castor according to claim 1 wherein said brake means comprises a strip of non-skid material in the area adapted to contact said ribs of said grooved surface.

5. Castor according to claim 4 wherein said strip is made of polyurethane and is overmolded on said brake means.

6. Castor according to claim 1 wherein each flange has a profile adapted to cooperate by nesting with a complementary profile of said brake means.

7. Castor for a trolley adapted to be immobilized on a grooved walkway surface defined by ribs and grooves, said castor comprising:

a yoke having a stop and two arms;

a rotation spindle supported by said two arms;

two spaced-apart flanges rotatably mounted on said rotation spindle, said flanges having respective peripheral areas; and brake means rotatably mounted on said spindle, said brake means comprising a first portion, said first portion being recessed with respect to said peripheral areas and adapted to come into contact with said ribs of said grooved walkway, and a second portion projecting beyond said peripheral areas, said second portion comprising an abutment engageable with said yoke stop upon rotation of said brake means.

8. Castor of claim 7 wherein said brake means comprises a brake disk mounted between said flanges.

9. Castor of claim 8 wherein said first portion comprises a brake skid mounted on an edge of said brake disk.

10. Castor of claim 9 wherein said first portion further comprises a sole affixed to said skid.

11. Castor of claim 7 wherein said yoke further comprises a downwardly facing cup.

12. Castor of claim 11 wherein said cup has an inside wall, said inside wall being said stop.

13. Castor of claim 11 wherein said second portion is a radially outward projection, an end of said projection being housed in said cup.

* * * * *